United States Patent
Kurokawa et al.

(10) Patent No.: US 10,017,386 B2
(45) Date of Patent: Jul. 10, 2018

(54) SPHERICAL BORON NITRIDE FINE PARTICLES AND PRODUCTION METHOD THEREOF

(71) Applicants: DENKA COMPANY LIMITED, Tokyo (JP); NATIONAL INSTITUTE FOR MATERIALS SCIENCE, Tsukuba-shi, Ibaraki (JP)

(72) Inventors: Fumihiro Kurokawa, Omuta (JP); Seitaro Kobayashi, Omuta (JP); Takashi Kawasaki, Machida (JP); Go Takeda, Machida (JP); Yoshio Bando, Tsukuba (JP); Dmitri Golberg, Tsukuba (JP)

(73) Assignees: DENKA COMPANY LIMITED, Tokyo (JP); NATIONAL INSTITUTE FOR MATERIALS SCIENCE, Tsukuba-shi, Ibaraki (JP)

(*) Notice: Subject to any disclaimer, the term of this patent is extended or adjusted under 35 U.S.C. 154(b) by 0 days.

(21) Appl. No.: 15/117,853

(22) PCT Filed: Feb. 9, 2015

(86) PCT No.: PCT/JP2015/053489
§ 371 (c)(1),
(2) Date: Aug. 10, 2016

(87) PCT Pub. No.: WO2015/122379
PCT Pub. Date: Aug. 20, 2015

(65) Prior Publication Data
US 2016/0368769 A1   Dec. 22, 2016

(30) Foreign Application Priority Data
Feb. 12, 2014   (JP) .................. 2014-024009

(51) Int. Cl.
*C01B 21/064*   (2006.01)

(52) U.S. Cl.
CPC ...... *C01B 21/0646* (2013.01); *C01P 2004/03* (2013.01); *C01P 2004/04* (2013.01);
(Continued)

(58) Field of Classification Search
None
See application file for complete search history.

(56) References Cited

FOREIGN PATENT DOCUMENTS

| CN | 1396003 A | 2/2003 |
|---|---|---|
| CN | 1931719 A | 3/2007 |

(Continued)

OTHER PUBLICATIONS

PCT, "International Search Report for International Application No. PCT/JP2015/053489".

(Continued)

*Primary Examiner* — Ronak C Patel
(74) *Attorney, Agent, or Firm* — Manabu Kanesaka

(57) ABSTRACT

A spherical boron nitride fine particle suited for use as a highly thermoconductive filler or the like has an average particle diameter of 0.01 to 1.0 μm, an orientation index of 1 to 15, a boron nitride purity of 98.0% by mass or greater, and an average circularity of 0.80 or greater. A method of producing a spherical boron nitride fine particle includes reacting ammonia with an alkoxide borate at an ammonia/alkoxide borate molar ratio of 1 to 10 in an inert gas stream at 750° C. or higher within 30 seconds, then applying heat treatment to a reaction product in an atmosphere of ammonia gas or a mixed gas of ammonia gas and an inert gas at 1,000 to 1,600° C. for at least 1 hour, and further firing the reaction product in an inert gas atmosphere at 1,800 to 2,200° C. for at least 0.5 hour.

1 Claim, 3 Drawing Sheets

(52) U.S. Cl.
CPC ...... *C01P 2004/32* (2013.01); *C01P 2004/62* (2013.01); *C01P 2004/64* (2013.01); *C01P 2006/80* (2013.01)

(56) References Cited

FOREIGN PATENT DOCUMENTS

| | | |
|---|---|---|
| JP | H04-42897 A | 2/1992 |
| JP | H08-290905 A | 11/1996 |
| JP | H09-202663 A | 8/1997 |
| JP | 2000-0327312 A | 11/2000 |
| JP | 2004-182572 A | 7/2004 |
| JP | 2008-266101 A | 11/2008 |
| JP | 2010-180066 A | 8/2010 |

OTHER PUBLICATIONS

Non-Patent Publication: ChengChun Tang et al., Advanced Functional Materials, 2008, 18, pp. 3653-3661.
China Patent Office, "Office Action for Chinese Patent Application No. 201580008547.9," dated Feb. 11, 2018.

SPHERICAL BORON NITRIDE FINE PARTICLES AND PRODUCTION METHOD THEREOF

RELATED APPLICATIONS

The present application is National Phase of International Application No. PCT/JP2015/053489 filed Feb. 9, 2015, and claims priority from Japanese Application No. 2014-024009, filed Feb. 12, 2014, the disclosure of which is hereby incorporated by reference herein in its entirety.

FIELD OF THE INVENTION

The present invention relates to a spherical boron nitride fine particle well suited for use as a highly thermoconductive filler or the like, and a production method thereof.

BACKGROUND ART

Hexagonal boron nitride (hereinafter called "boron nitride"), because of having lubrication capability, high thermal conductivity and insulation capability, is now widely used as releasing agents for solid lubricants, molten glasses and aluminum or the like as well as fillers for thermal radiation materials.

To be compatible with higher performances of recent computers and electronic hardware in particular, measures against thermal radiation have increased in importance and attention has been directed to the high thermal conductivity of boron nitride.

In recent years, it has been studied to add boron nitride to the resin layers of printed wiring boards and flexible copper-clad laminated sheets for the purpose of imparting high thermal conductivity and insulation to them.

While generally available boron nitride has an average particle diameter of a few µm to 20 µm, some resin substrates for printed wiring boards and flexible copper-clad laminated sheets have a thickness of the order of several tens µm, and large average particle diameters of boron nitride result in poor dispersibility in resins, failing to obtain smooth surfaces, or with that boron nitride dispersed, there are hard spots appearing, often making it impossible to keep the strength of the resin layer high. For these reasons, there is mounting demand for boron nitride fine particles of the submicron order (0.1 µm).

To have high thermal conductivity, the boron nitride must be of high purity and high crystallinity, and the same goes for boron nitrite fine particles on the submicron order (0.1 µm).

On the other hand, the boron nitride has a characteristic scaly shape, and its thermal properties are overwhelmingly better in the major or minor diameter direction than in the thickness or perpendicular direction. For this reason, the thermal properties of a composite material having boron nitride filled or packed in a resin such as silicone are considerably affected by the directionality of boron nitride fine particles in the composite material.

For instance when the composite material is provided in a sheet form, however, the boron nitride fine particles are often apt to lie down laterally and the necessary sufficient thermal properties are not obtained anymore in the longitudinal direction.

It follows that in order to be well fitted as a highly thermoconductive filler, the boron nitride must be configured into a spherical or aggregate shape thereby keeping the influence of directionality less.

The boron nitride is generally obtained by reactions at high temperatures between a boron source (boric acid, borax, etc.) and a nitrogen source (urea, melamine, ammonia, etc.), and a "pineal" boron nitride obtained by the aggregation of scaly primary particles from boric acid and melamine has been proposed in the art (Patent Publication 1).

However, the aggregate particle diameter of boron nitride prepared by this method is greater than 50 µm; in other words, it is difficult to prepare boron nitride fine particles of the submicron order—the object of the invention.

On the other hand, there have been reports (Patent Publications 2, 3 and 4) about how to obtain boron nitride fine particles by a vapor-phase synthesis process.

However, boron nitride fine particles obtained by these methods, because of having low crystallinity, are found to be less than satisfactory in terms of boron nitride's characteristics: lubrication capability and high thermal conductivity.

PRIOR ARTS

Patent Publications

Patent Publication 1: JP(A) 09-202663
Patent Publication 2: JP(A) 2000-327312
Patent Publication 3: JP(A) 2004-182572
Patent Publication 4: JP(A) 2010-180066

SUMMARY OF THE INVENTION

Objects of the Invention

An object of the invention is to provide a submicron-order spherical boron nitride fine particle having a high sphericity.

Embodiments of the Invention

To achieve the aforesaid object, the present invention is embodied as follows.

(1) A spherical boron nitride fine particle, characterized by having an average particle diameter of 0.01 to 1.0 µm, an orientation index of 1 to 15, a boron nitride purity of 98.0% by mass or greater, and an average circularity of 0.80 or greater.

(2) A method of producing a spherical boron nitride fine particle, characterized by reacting ammonia with an alkoxide borate at an ammonia/alkoxide borate molar ratio of 1 to 10 in an inert gas stream at 750° C. or higher within 30 seconds, then applying heat treatment to a reaction product in an atmosphere of ammonia gas or a mixed gas of ammonia gas and an inert gas at 1,000 to 1,600° C. for at least 1 hour, and further firing the reaction product in an inert gas atmosphere at 1,800 to 2,200° C. for at least 0.5 hour.

Advantages of the Invention

According to the invention, it is possible to provide a submicron-order spherical boron nitride fine particle having a high sphericity.

MODES FOR CARRYING OUT THE INVENTION

Figure 1:
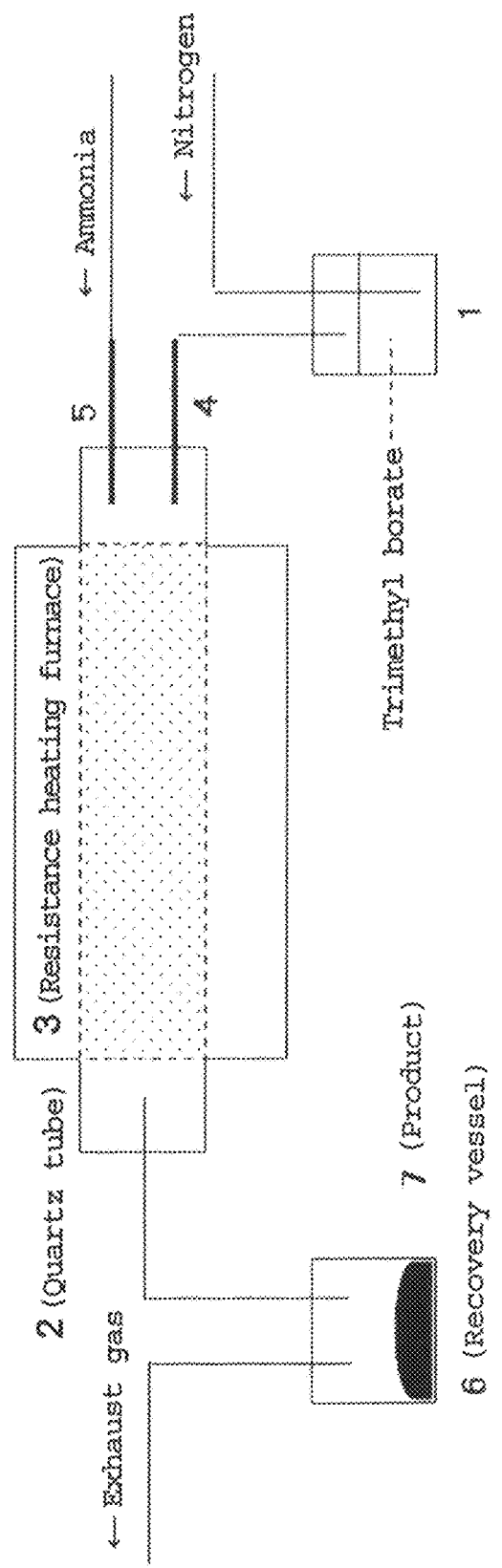
FIG. 1 is a schematic view of the apparatus of producing boron nitride fine particles under firing condition 1.

In the invention described here, a tubular furnace 3 is first used in an inert gas stream for a so-called gas phase reaction between a vaporized alkoxide borate and ammonia thereby continuously synthesizing a white powder (firing condition 1). Then, this white powder is fired in the tubular furnace 3 (resistance heating furnace) (firing condition 2). Finally, the fired product is charged in a boron nitride crucible that is then transferred to an induction heating furnace in which the fired product is further fired into a boron nitride fine particle (firing condition 3).

It is here to be noted that unless otherwise specified, % is given on the mass basis.

As described above, there are three firing conditions used in the invention: in firing temperature ascending order, firing condition 1 of at least 750° C., firing condition 2 of 1,000 to 1,600° C., and firing condition 3 of 1,800 to 2,200° C. Under firing conditions 1 and 2 the tubular furnace 3 may be used in the resistance heating mode, and under firing condition 3 an electric furnace may be used as the tubular furnace 3 in the induction heating mode. Of course, there is no problem at all with the use of the induction heating mode of electric furnace under firing conditions 1 and 2.

The invention will now be explained with reference to the accompanying drawings.

An apparatus used under firing condition 1 to prepare boron nitride fine particles comprises a tubular furnace 3 (resistance heating furnace), a reaction tube (quartz tube) 2, an alkoxide borate feeder vessel 1, an alkoxide borate inlet pipe 4, an ammonia gas inlet pipe 5, a sample recovery vessel 6, etc.

The spherical boron nitride fine particles of the invention are continuously synthesized by the so-called gas-phase reaction between a vaporized alkoxide borate and ammonia. This requires the use of an apparatus capable of continuous synthesis, and an apparatus using such a tubular furnace 3 as shown typically in FIG. 1 is preferably used under firing condition 1.

While there is no particular limitation on the tubular furnace 3, it is preferable to use an easy-to-handle electric furnace.

An electric furnace operates on the basic principle that a heating element or the like forming a furnace generates heat by the passage of electric current for heating of the interior of the furnace, and is specialized on the basis of heating modes and heating element materials.

Generally, heating up to nearly 1,700° C. may be carried out in the resistance heating mode using a heating element, but for heating up to nearly 2,000° C. there is a coil induction heating mode in need.

By way of example but not by way of limitation, the heating element may be formed of a material such as silicon carbide or carbon.

Although there is no particular limitation on the material of the reaction tube 2 used herein, it is preferable to make use of alumina or quartz having chemical stability and good heat resistance.

Reference is now made to FIG. 1 that is a schematic view of firing condition 1 where a quartz tube is used as the reaction tube 2 and trimethyl borate is used as the alkoxide borate.

The quartz tube 2 is placed in the resistance heating furnace 3 that is heated up to a given temperature. Then, trimethyl borate is placed in the feeder vessel 1 and introduced together with nitrogen into the quartz tube 2 by way of the inlet pipe 4. In the meantime, ammonia is also introduced into the quartz tube 2 by way of the inlet pipe 5. The introduced trimethyl borate and ammonia react with each other in the heated quartz tube 2, yielding white powders (firing condition 1). Some white powders adhere to the interior of the quartz tube 2, but the rest is all delivered to the recovery vessel 6 together with nitrogen and unreacted ammonia. The white powder product (product 7) is recovered in the recovery vessel 6.

The temperature of the tubular furnace 3 is preferably 750° C. or higher. At lower than 750° C., the resultant boron nitride fine particles often come to have an average particle diameter of greater than 1.0 μm.

The reaction between trimethyl borate and ammonia gets done within 30 seconds. Exceeding 30 seconds may possibly cause the boron nitride fine particles to have an average particle diameter of greater than 1.0 μm.

The alkoxide borate used herein includes trimethyl borate, triethyl borate and tri-isopropyl borate, among which the trimethyl borate is preferred because of its high reactivity with ammonia and its availableness. The trimethyl borate is available as reagents from many companies in general, and in the form of a reagent under the trade name of "TMB" from Tama Chemicals Corporate in particular.

While there is also no particular limitation on the ammonia used herein, it is preferable to use a so-called impurity-free "high-purity" type.

While there is no particular limitation on the inert gas used herein, there is the mention of less chemical reactive gases, for instance, noble or rare gases such as helium, neon and argon, and nitrogen.

The ammonia and alkoxide borate are fed at a molar ratio of 1 to 10. As the ammonia/alkoxide borate molar ratio is less than 1, it is likely that the boron nitride fine particles may have a purity of lower than 98.0%, and as that molar ratio is greater than 10, it is likely that the boron nitride fine particles may have an average particle diameter of less than 0.01 μm.

The feeding of alkoxide borate and ammonia is put off, and the tubular furnace 3 is powered off to recover the white powders synthesized under firing condition 1. Then, firing is carried out by the apparatus shown typically in FIG. 2 under firing condition 2.

The apparatus used under firing condition 2 is built up of a resistance heating furnace 3' and a reaction tube 2' formed of alumina. The white powder product (product 7) synthesized under firing condition 1 is filled in the middle of the reaction tube that is then placed in the resistance heating furnace 3'. After that, nitrogen is introduced from an inlet pipe 4' and ammonia is introduced from an inlet pipe 5'. After heated to a given temperature, the white powder product is fired for a given period of time. After the completion of firing, the resistance heating furnace 3' is cooled down for recovery of the fired product.

Under firing condition 2 an induction heating furnace may be used instead.

The temperature of the resistance heating furnace 3 is in the range of 1,000 to 1,600° C. Out of this range, the boron nitride fine particles are likely to have an orientation index of greater than 15.

The reaction time under firing condition 2 is 1 hour or longer. In less than 1 hour, the boron nitride fine particles are likely to have an orientation index of greater than 15 and a scaly shape having a lower circularity.

The atmosphere used under fining condition 2 is preferably ammonia gas or an ammonia gas/inert gas mixture. In the absence of ammonia gas, the boron nitride fine particles are likely to have an orientation index of greater than 15 or a purity of less than 98.0%, and to take a scaly shape having a lower average circularity.

After the completion of the reaction under firing condition 2, the electric furnace is powered off and the introduction of nitrogen or ammonia is put off, followed by cooling.

The fired product obtained under firing condition 2 is placed in a boron nitride crucible, and then further fired under firing condition 3 in an induction heating furnace at a given temperature, in which furnace a nitrogen atmosphere prevails.

It is here to be noted that the firing temperature is as high as about 2,000° C.; so it is preferable to use the induction heating furnace as the firing furnace.

The temperature under firing condition 3 is 1,800 to 2,200° C. At lower than 1,800° C., the boron nitride fine particles are likely to have a purity of lower than 98.0%, and at higher than 2,200° C., the boron nitride fine particles are likely to break down.

The reaction time under fining condition 3 is 0.5 hour or longer. In less than 0.5 hour, the boron nitride fine particles are likely to have a purity of lower than 98.0%.

The boron nitride fine particles of the invention have an average particle diameter of 0.05 to 1.0 µm. Out of this range, there is poor dispersibility in resins, failing to obtain smooth surfaces, or upon dispersed in a resin, there are hard spots appearing in the resin, often making it impossible to keep the strength of the resin layer high.

The orientation index of the boron nitride fine particles of the invention, represented by a ratio ($I_{002}/I_{100}$) between the diffraction line intensity $I_{002}$ of the (002) plane and the diffraction line intensity $I_{100}$ of the (100) plane as measured by powder X-ray diffractometry, should be 1 to 15 so as to obtain high thermal conductivity.

The boron nitride fine particles of the invention should have a boron nitride purity of at least 98.0% so as to obtain high thermal conductivity.

The boron nitride fine particles of the invention should have an average circularity of at least 0.80 so as to obtain high thermal conductivity.

EXAMPLES

The present invention will now be explained in further details with reference to experimental runs.
Experimental Run 1
Firing Condition 1

The quartz tube 2 was placed in the resistance heating furnace 3 that was then heated to a given temperature. Trimethyl borate was introduced from the feeder vessel 1 together with nitrogen into the quartz tube 2 by way of the inlet pipe 4. In the meantime, ammonia was also introduced into the quartz tube 2 by way of the inlet pipe 5. The introduced trimethyl borate and ammonia reacted with each other in the heated quartz tube 2, yielding a white power product. The resultant white powder product was recovered in the recovery vessel 6.

Firing Condition 2

Figure 2:
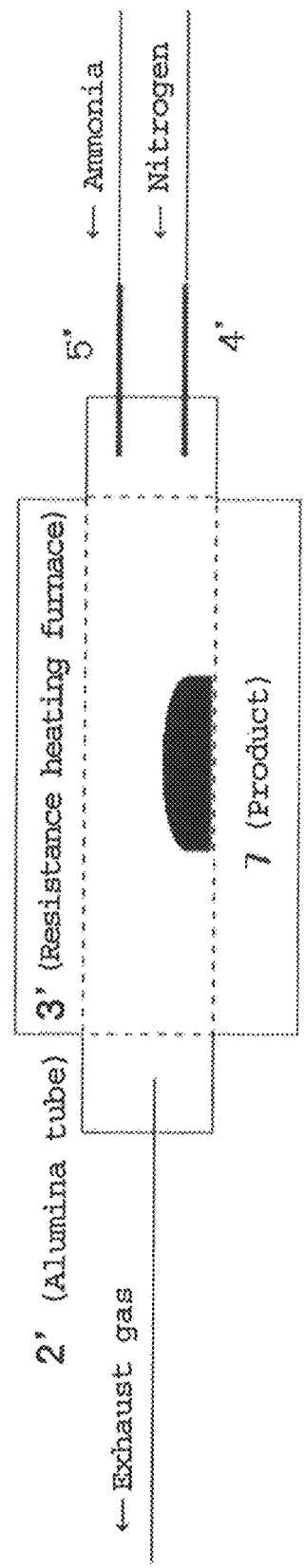
FIG. 2 is a schematic view of the apparatus of producing boron nitride fine particles under firing condition 2.

The white powder product recovered under firing condition 1 was fired in the apparatus shown in FIG. 2.

The white powder product was filled up in the middle of the alumina tube 2' that was then placed in the resistance heating furnace 3', after which nitrogen and ammonia were admitted in from the inlet pipes 4' and 5', respectively. After heated up to the given temperatures indicated in Table 1, the white powder product was fired for a given time, after which the fired product was cooled down for recovery.

Firing Condition 3

The fired product obtained under firing condition 2 was placed in a boron nitride crucible, and further fired at a given temperature indicated in Table 1 in the induction heating furnace, in which a nitrogen atmosphere prevailed. The resultant boron nitride fine particles were measured in terms of average particle diameter (APD), orientation index (OI), boron nitride purity (BN) and average circularity (AC). The results are set out in Table 1.

It is to be noted that the temperature, time and firing atmosphere under firing conditions 1, 2 and 3 are also tabulated.

Figure 3:
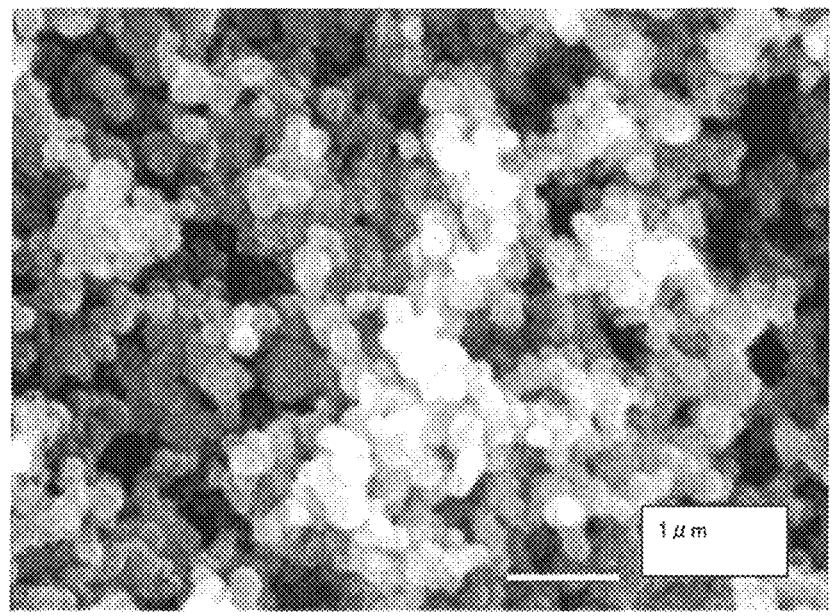
FIG. 3 is an electron micrograph taken of spherical boron nitride fine particles according to an example of the invention.
Figure 4:
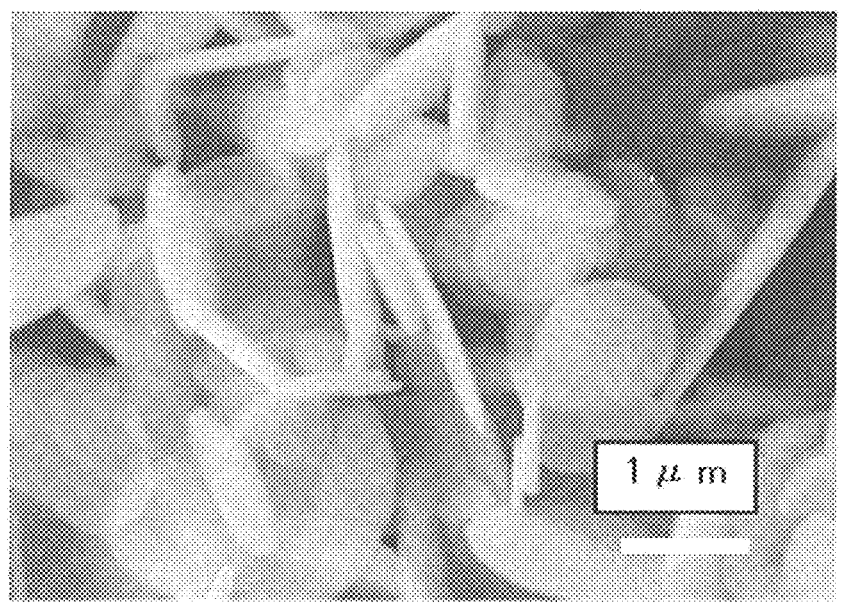
FIG. 4 is an electron micrograph taken of spherical boron nitride fine particles according to a comparative example of the invention.

It is also to be noted that an electron micrograph taken of an example of the invention is attached hereto as FIG. 3, and an electron micrograph taken of a comparative example is attached hereto as FIG. 4.

Materials Used

Trimethyl Borate ($C_3H_9BO_3$): Reagent Trimethoxy Borane made by Wako Pure Chemical Industries, Ltd.
Ammonia: Commercially available high-purity type Measuring Methods The average particle diameter was measured using a laser diffraction/scattering particle size distribution analyzer made by Coulter and available under the trade name of LS-230.

For the orientation index, an X-ray diffractometry apparatus (Geiger Flex 2013 Model) made by Rigaku Corporation was used in a range of 2θ=30°–25° to measure the intensity $I_{002}$ of a diffraction line in the vicinity of 2θ=27-28° (the plane (002)) and the intensity $I_{100}$ of a diffraction line in the vicinity of 2θ=41° (the plane (100)). The orientation index $I_{002}/I_{100}$ was figured out from the peak intensity ratio of X-ray diffraction of boron nitride.

The boron nitride purity was measured by a method in which a sample was subjected to decomposition with an alkali sodium hydroxide, and ammonia was distilled out by a steam distillation process for collection in a boric acid solution. The resultant solution was titrated with a sulfuric acid normal solution to find the amount of nitrogen (N), after which the boron nitride purity (BN) was calculated from BN (%)–N (%)×1.772.

For the average circularity, a particle image was taken using a scanning electron microscope (SEM) or a transmission electron microscope (TEM), and an image analyzer (for instance, trade name "MacView" available from Mountech Co., Ltd.) was then used to measure the projection area (S) and peripheral length (L) of the particle. The circularity was found by:

$$Circularity = 4\pi S/L^2$$

Arbitrarily selected one hundred particles were measured in terms of circularity, and the resultant average value was used as the average circularity for the sample.

TABLE 1

| Run No. | NH$_3$/C$_3$H$_9$BO$_3$ (molar ratio) | Firing Cond. 1 (° C.) | (sec.) | Firing Cond. 2 (° C.) | (hr.) | Gas | Firing Cond. 3 (° C.) | (hr.) |
|---|---|---|---|---|---|---|---|---|
| 1-1 | 0.8 | 1,000 | 10 | 1,350 | 5 | N$_2$/NH$_3$ | 2,000 | 4 |
| 1-2 | 1.2 | 1,000 | 10 | 1,350 | 5 | N$_2$/NH$_3$ | 2,000 | 4 |
| 1-3 | 3.5 | 1,000 | 10 | 1,350 | 5 | N$_2$/NH$_3$ | 2,000 | 4 |
| 1-4 | 9.7 | 1,000 | 10 | 1,350 | 5 | N$_2$/NH$_3$ | 2,000 | 4 |
| 1-5 | 10.3 | 1,000 | 10 | 1,350 | 5 | N$_2$/NH$_3$ | 2,000 | 4 |
| 1-6 | 3.5 | 720 | 10 | 1,350 | 5 | N$_2$/NH$_3$ | 2,000 | 4 |
| 1-7 | 3.5 | 760 | 10 | 1,350 | 5 | N$_2$/NH$_3$ | 2,000 | 4 |
| 1-8 | 3.5 | 1,300 | 10 | 1,350 | 5 | N$_2$/NH$_3$ | 2,000 | 4 |
| 1-9 | 3.5 | 1,000 | 25 | 1,350 | 5 | N$_2$/NH$_3$ | 2,000 | 4 |
| 1-10 | 3.5 | 1,000 | 40 | 1,350 | 5 | N$_2$/NH$_3$ | 2,000 | 4 |
| 1-11 | 3.5 | 1,000 | 10 | 950 | 5 | N$_2$/NH$_3$ | 2,000 | 4 |
| 1-12 | 3.5 | 1,000 | 10 | 1,020 | 5 | N$_2$/NH$_3$ | 2,000 | 4 |
| 1-13 | 3.5 | 1,000 | 10 | 1,600 | 5 | N$_2$/NH$_3$ | 2,000 | 4 |
| 1-14 | 3.5 | 1,000 | 10 | 1,630 | 5 | N$_2$/NH$_3$ | 2,000 | 4 |
| 1-15 | 3.5 | 1,000 | 10 | 1,350 | 0.5 | N$_2$/NH$_3$ | 2,000 | 4 |
| 1-16 | 3.5 | 1,000 | 10 | 1,350 | 1 | NH$_3$ | 2,000 | 4 |
| 1-17 | 3.5 | 1,000 | 10 | 1,350 | 5 | N$_2$ | 2,000 | 4 |
| 1-18 | 3.5 | 1,000 | 10 | 1,350 | 5 | N$_2$/NH$_3$ | 2,000 | 4 |
| 1-19 | 3.5 | 1,000 | 10 | 1,350 | 5 | N$_2$/NH$_3$ | 1,750 | 4 |
| 1-20 | 3.5 | 1,000 | 10 | 1,350 | 5 | N$_2$/NH$_3$ | 1,800 | 4 |
| 1-21 | 3.5 | 1,000 | 10 | 1,350 | 5 | N$_2$/NH$_3$ | 2,150 | 4 |
| 1-22 | 3.5 | 1,000 | 10 | 1,350 | 5 | N$_2$/NH$_3$ | 2,230 | 4 |
| 1-23 | 3.5 | 1,000 | 10 | 1,350 | 5 | N$_2$/NH$_3$ | 2,000 | 0.4 |
| 1-24 | 3.5 | 1,000 | 10 | 1,350 | 5 | N$_2$/NH$_3$ | 2,000 | 0.8 |

| Run No. | APD (μm) | OI | BN (%) | AC | Remarks |
|---|---|---|---|---|---|
| 1-1 | 0.20 | 5.6 | 97.8 | 0.90 | Comparative |
| 1-2 | 0.50 | 6.0 | 98.3 | 0.88 | Inventive |
| 1-3 | 0.20 | 6.0 | 99.0 | 0.90 | Inventive |
| 1-4 | 0.05 | 5.5 | 99.2 | 0.90 | Inventive |
| 1-5 | 0.008 | 4.0 | 99.2 | 0.90 | Comparative |
| 1-6 | 1.10 | 6.0 | 98.2 | 0.85 | Comparative |
| 1-7 | 0.50 | 6.0 | 98.7 | 0.87 | Inventive |
| 1-8 | 0.20 | 8.0 | 99.1 | 0.89 | Inventive |
| 1-9 | 0.70 | 7.0 | 99.0 | 0.85 | Inventive |
| 1-10 | 1.20 | 10.0 | 98.8 | 0.87 | Comparative |
| 1-11 | 0.90 | 18.0 | 98.3 | 0.80 | Comparative |
| 1-12 | 0.40 | 10.0 | 98.8 | 0.84 | Inventive |
| 1-13 | 0.30 | 13.0 | 99.2 | 0.82 | Inventive |
| 1-14 | 0.60 | 16.0 | 99.1 | 0.81 | Comparative |
| 1-15 | 1.00 | 25.0 | 98.7 | * | Comparative |
| 1-16 | 0.20 | 7.0 | 98.6 | 0.85 | Inventive |
| 1-17 | 1.00 | 22.0 | 97.0 | * | Comparative |
| 1-18 | 0.20 | 7.0 | 99.0 | 0.86 | Inventive |
| 1-19 | 0.20 | 8.0 | 97.8 | 0.88 | Comparative |
| 1-20 | 0.20 | 6.0 | 98.4 | 0.86 | Inventive |
| 1-21 | 0.70 | 11.0 | 99.4 | 0.83 | Inventive |
| 1-22 | Particle Broken Down | | | | Comparative |
| 1-23 | 0.70 | 4.5 | 97.7 | 0.91 | Comparative |
| 1-24 | 0.20 | 6.5 | 98.1 | 0.89 | Inventive |

* Scaly shape

EXPLANATION OF THE REFERENCE NUMERALS

1: Feeder vessel for the alkoxide borate
2: Reaction tube (quartz tube)
2': Reaction tube (alumina tube)
3, 3': Tubular furnace (resistance heating furnace)
4: Alkoxide borate inlet pipe
4': Nitrogen inlet pile
5, 5': Ammonia gas inlet pipe
6: Sample recovery vessel
7: Product

What is claimed is:
1. A spherical boron nitride fine particle, characterized by having an average particle diameter of 0.01 to 1.0 μm, an orientation index of 1 to 15, a boron nitride purity of 98.0% by mass or greater, and an average circularity of 0.80 or greater.

* * * * *